United States Patent Office 2,875,136
Patented Feb. 24, 1959

2,875,136

PROCESS FOR PRODUCING STREPTOMYCIN

Edwin J. Ratajak, Roslyn, and Robert C. Nubel, Levittown, N. Y., assignors to Chas. Pfizer & Co., Inc., New York, N. Y., a corporation of Delaware No Drawing. Application March 11, 1957
Serial No. 645,023

6 Claims. (Cl. 195—114)

This invention relates to a process whereby the production and yield of the antibiotic known as streptomycin may be improved, resulting in a high yield of product at a decreased cost. In particular, it is concerned with the production of streptomycin by fermenting a streptomycin-producing microorganism in a nutrient medium in which the antibiotic may be formed in substantially increased yields by the inclusion of an azoarylsulfonic acid dye selected from the class of azoarylsulfonic acid alkali metal salts.

It is also within the scope of the present invention to provide a culture medium in which this antibiotic may be more effectively produced. It is a further object of the present process to produce a fermentation medium in which an azoarylsulfonic acid salt is introduced which will cause an increase in the amount of streptomycin elaborated. The improvement of the present invention comprises conducting the fermentation in the presence of an azoarylsulfonic acid salt selected from the group consisting of an alkali metal salt of p-(2-hydroxy-1-naphthylazo) benzenesulfonic acid, an alkali metal salt of diphenyldiazo-bis-α-naphthylaminesulfonic acid and an alkali metal salt of p-dimethylaminophenyl-azobenzenesulfonic acid.

The product called streptomycin is an antibiotic isolated from the culture of a strain of *Streptomyces griseus*. It is effective not only against Gram-negative bacteria as well as Gram-positive bacteria, but also against *Mycobacterium tuberculosis*. In view of the fact that the free base is unstable, streptomycin is usually prepared in the form of its sulfate or hydrochloride salt. It is to be understood that for the production of streptomycin the present invention is not limited to any particular organism, but it is intended to include the use of variants of any new strain of this species as well as any mutants produced from the described organism by various means, such as x-radiation, ultraviolet radiation, and the like.

In the past, fermentation media have been used which have given commercially practical yields of streptomycin, but by the improved process herein set forth it is found that the yield of the product is greatly increased and the process rendered much more efficient. The process described herein for the production of streptomycin by fermenting a nutrient medium with a culture of *S. griseus* comprises adding to the medium as azoarylsulfonic acid alkali metal salt. In particular, it comprises adding the azoarylsulfonic acid salt to the fermentation medium, inoculating the medium with a culture of *S. griseus* and permitting growth of this microorganism until a commercially useful quantity of this antibiotic is produced.

The salts of the azoarylsulfonic acids which are suitable for the process of this invention are those of the alkali metals such as sodium, potassium, lithium, etc.; the preferred salt of this series is the sodium salt. Only a relatively small amount of such azoarylsulfonic salts need be present, generally in the range of from about 0.20 to 2.5 g. per liter of fermentation medium. It is within the purview of this invention to add the azoarylsulfonic acid salt to the *S. griseus* fermentation medium, either initially or sometime after fermentation has commenced, thereby obtaining a streptomycin potency which is a substantial increase over that of the control. In general, it is most desirable to add the azoarylsulfonic acid salt to the medium within 24 hours of initiation of the fermentation.

The fermentation broth must have present in it an organic dye selected from the class of azoarylsulfonic acid alkali metal salts. For this purpose, it is desirable that there be present at least 0.20 g. of dye per liter in the fermentation medium. These azoarylsulfonic acid alkali metal salts are selected from the group consisting of the sodium salt of p-(2-hydroxy-1-naphthylazo) benzenesulfonic acid (Orange II dye), the sodium salt of diphenyldiazo-bis-α-naphthylaminesulfonic acid (Congo Red dye) and the sodium salt of p-dimethyl-aminophenylazobenzenesulfonic acid (Methyl Orange dye); they are all found to be extremely valuable for use in the process of this invention.

It has also been found that for maximum growth, it is necessary that the pH of the fermentation medium be controlled within a particular range. Highly effective growths may be obtained within the range of from about 5 to about 8. Optimum results are obtained within the range of approximately 6 to 7.5. In addition, the fermentation process should be conducted under aseptic conditions so as to produce a therapeutically desirable product.

During the fermentation, it is necessary that there be present in the nutrient medium a carbohydrate, such as sucrose, dextrose or starch, or crude nutrients containing these, as a source of energy for the microorganism. It is also necessary that a source of nitrogen, such as ammonium salts, corn steep liquor, casein, soybean meal or peptones, be present for the sustenance of the microorganism.

The fermentation may take place either on the surface of the quiescent fluid, in shaken flasks, or in deep tanks aided by constant agitation and aeration. For large scale commercial production, the use of deep stainless steel tanks with constant aeration and agitation gives a more rapid and efficient method of production than is obtained by other means. The cultivation of the microorganism *S. griseus* preferably takes place at a temperature in the range of 24 to 30° C. A time period of approximately 48 hours for the fermentation has been found most desirable in many instances. In general, a range from about one to five days gives very satisfactory results.

Spores may be used directly as an inoculum, but the most economical production is obtained when preformed inoculum is used in the concentration range between approximately 1 and 5% by volume of the main fermentation medium. A convenient method of operation is to start with an agar slant of the microorganisms and seed shaker flasks containing nutrient media with the *Streptomyces griseus* from the agar slant.

When Orange II dye is added to the fermentation mixture, the streptomycin yield is often increased two-fold. In Table I, some typical results are illustrated.

TABLE I

| Amount of Orange II | Potency of Streptomycin (γ/ml.) | Percent of Control |
| --- | --- | --- |
| No Orange II (Control) | 1,355 | 100 |
| Orange II, 0.25 g./l | 1,924 | 142 |
| Orange II, 0.5 g./l | 3,252 | 240 |
| Orange II, 1.0 g./l | 2,791 | 206 |
| Orange II, 1.5 g./l | 2,335 | 172 |
| Orange II, 2.0 g./l | 2,141 | 158 |

Similarly, Congo Red serves to increase the amount of streptomycin produced. As illustrated in Table II, the following typical results are obtained on addition of Congo Red to the nutrient medium.

TABLE II

| Amount of Congo Red | Potency of Streptomycin (γ/ml.) | Percent of Control |
| --- | --- | --- |
| No Congo Red (Control) | 1,500 | 100 |
| Congo Red, 0.25 g./l | 2,380 | 158 |
| Congo Red, 0.50 g./l | 2,700 | 180 |
| Congo Red, 0.80 g./l | 3,000 | 200 |

The data presented in these tables show the preferred operating conditions for obtaining maximum yields with the particular strain herein utilized.

Hence, it can be seen from these data that the effect of adding the azoarylsulfonic acid sodium salts to the *S. griseus* fermentation medium results in potency increases that are both real and substantial.

This invention is further illustrated by the following examples, which are not to be considered as imposing any limitation thereon.

*Example I*

A nutrient medium was prepared from the following materials in one liter of tap water:

```
                                                    Grams
Soybean meal _____ 20.0
Corn steep liquor _____ 20.0
Corn meal _____ 10.0
Potassium dihydrogen phosphate _____ 2.0
Sodium nitrate _____ 6.0
```
Tap water, in sufficient amount for a 1000 ml. solution, adjusted to pH 7.0 with potassium hydroxide.

The above medium was then autoclaved at 20 lbs. per sq. in. for 60 minutes in order to sterilize the same. Flasks containing this medium were then inoculated with a slant culture of a mutant streptomycin-producing strain of *S. griseus*. The seed medium was then incubated at 28° C. for 48 hours wtih constant agitation.

For the above inoculum, the following fermentation medium was prepared containing tap water as a diluent in a 3 liter fermentor (2000 ml. of medium per fermentor):

```
                                                    Grams
Cerelose (dextrose hydrate) _____ 50.0
Corn dextrin _____ 5.0
Ammonium nitrate _____ 7.5
Potassium dihydrogen phosphate _____ 0.5
Zinc sulfate heptahydrate _____ 0.044
Magnesium sulfate heptahydrate _____ 0.25
```
Tap water, in sufficient amount for a 1000 ml. solution, adjusted to pH 6.7 with potassium hydroxide.

After the pH had been adjusted, 10 g. of calcium carbonate, 2 ml. of soybean oil antifoam and 0.5 g. of Orange II dye were added, and the mixture autoclaved at atmospheric pressure for about 60 minutes to sterilize the same. After cooling to room temperature, the nutrient medium in each fermentor was then inoculated with with pre-formed inoculum described as above, using 5% by volume, and permitted to grow at 26–27° C. for a maximum time period of about 120 hours with constant agitation and aeration; the latter was accomplished by cultivating the organism aerobically under submerged conditions at an air flow rate of ¼ volume of air per volume of medium per minute. In addition to its other effect, the agitation maintains the calcium carbonate in suspension. A portion of the final mash was adjusted to a pH of about 3 with sulfuric acid, filtered and assayed. It was found that the amount of streptomycin produced was 3252γ/ml.; this represented a 2.4-fold increase over the control value (1355γ/ml.) obtained when the process is conducted in the absence of any Orange II dye.

*Example II*

The same procedure as described in Example I was followed except that 0.80 g. of Congo Red dye was present in a liter of the fermentation mixture. A streptomycin potency of 3000γ/ml. was obtained; this represented a more than two-fold increase over the control value.

*Example III*

Similar runs were made under the same conditions as those for the preceding examples to determine the effect of various concentrations of Orange II or Congo Red dyes on the production of streptomycin; the results obtained are presented in Tables I and II. Thus, 1 g. of Orange II dye per liter of fermentation medium affords a streptomycin potency of 2791γ/ml., and 0.5 g. of Congo Red dye affords a potency of 2700γ/ml.; on the other hand, 0.25 g. of Orange II dye per liter affords a streptomycin potency of 1924γ/ml. while 0.25 g. of Congo Red dye per liter yields a streptomycin potency of 2380γ/ml.

*Example IV*

The same procedure as described in Example I was followed except that Methyl Orange dye was the azoarylsulfonic acid salt employed. It was found that a substantial increase in the amount of streptomycin elaborated was obtained over that of the control value.

*Example V*

The same procedure was followed as in Example I except that the Orange II dye was added to the reaction mixture 24 hours after the fermentation had commenced. The yield of streptomycin obtained was in the same range as that afforded when the dye was initially present in the fermentation medium.

What is claimed is:

1. In a process for the production of streptomycin by fermenting a nutrient medium with a streptomycin-producing microorganism, the improvement which comprises conducting the fermentation in the presence of an azoarylsulfonic acid salt selected from the group consisting of an alkali metal salt of p-(2-hydroxy-1-naphthylazo) benzenesulfonic acid, an alkali metal salt of diphenyldiazo-bis-α-naphthylaminesulfonic acid and an alkali metal salt of p-dimethyl-aminophenylazobenzenesulfonic acid.

2. In a process for the production of streptomycin by fermenting a nutrient medium with a culture of *Streptomyces griseus*, the improvement which comprises adding to the medium within 24 hours of initiation of the fermentation an azoarylsulfonic acid salt selected from the group consisting of an alkali metal salt of p-(2-hydroxy-1-naphthylazo) benzenesulfonic acid, an alkali metal of diphenyldiazo-bis-α-naphthylaminesulfonic acid and an alkali metal salt of p-dimethylaminophenylazobenzenesulfonic acid.

3. A process as claimed in claim 1 wherein the azoarylsulfonic acid alkali metal salt is the sodium salt of p-(2-hydroxy-1-naphthylazo) benzenesulfonic acid.

4. A process as claimed in claim 1 wherein the azoarylsulfonic acid alkali metal salt is the sodium salt of diphenyldiazo-bis-α-naphthylaminesulfonic acid.

5. A process as claimed in claim 1 wherein the azoarylsulfonic acid alkali metal salt is the sodium salt of p-dimethylaminophenylazobenzenesulfonic acid.

6. A process as claimed in claim 1 wherein the azoarylsulfonic acid salt is present in the concentration range of from about 0.20 to 2.5 g. per liter of the medium and the process is conducted at a pH in the range of from about 5 to about 8 at a temperature in the range of 24 to 30° for a time period of from about one to five days.

References Cited in the file of this patent

UNITED STATES PATENTS

| | | |
|---|---|---|
| 2,462,175 | Folkers | Feb. 22, 1949 |
| 2,555,760 | Regna | June 5, 1951 |
| 2,555,762 | Regna | June 5, 1951 |
| 2,560,889 | Regna | July 17, 1951 |
| 2,604,472 | Regna | July 22, 1952 |

OTHER REFERENCES

Kuehl et al.: Jour. Am. Chem. Soc., 68 (1946), 11, 1460–1462.